(12) United States Patent
Fujita et al.

(10) Patent No.: US 8,254,437 B2
(45) Date of Patent: Aug. 28, 2012

(54) TRANSMITTING APPARATUS, RECEIVING APPARATUS AND COMMUNICATION SYSTEM

(75) Inventors: Suguru Fujita, Tokyo (JP); Masahiro Mimura, Tokyo (JP); Kazuaki Takahashi, Tokyo (JP); Yoshinori Kunieda, Tokyo (JP); Noriyuki Ueki, Tokyo (JP)

(73) Assignee: Panasonic Corporation, Osaka (JP)

( * ) Notice: Subject to any disclaimer, the term of this patent is extended or adjusted under 35 U.S.C. 154(b) by 915 days.

(21) Appl. No.: 11/908,862

(22) PCT Filed: Mar. 9, 2006

(86) PCT No.: PCT/JP2006/304547
§ 371 (c)(1),
(2), (4) Date: Sep. 17, 2007

(87) PCT Pub. No.: WO2006/103892
PCT Pub. Date: Oct. 5, 2006

(65) Prior Publication Data
US 2010/0040168 A1 Feb. 18, 2010

(30) Foreign Application Priority Data

Mar. 29, 2005 (JP) ................... 2005-094252
Mar. 7, 2006 (JP) ................... 2006-060854

(51) Int. Cl.
*H03K 7/04* (2006.01)
*H03K 7/06* (2006.01)
*H03K 9/04* (2006.01)
*H03K 9/06* (2006.01)

(52) U.S. Cl. ................ 375/239; 327/1; 327/2; 329/313; 332/112; 370/205

(58) Field of Classification Search .................. None
See application file for complete search history.

(56) References Cited

U.S. PATENT DOCUMENTS 6,130,402 A * 10/2000 Abella et al. ............. 219/121.68
6,661,820 B1 * 12/2003 Camilleri et al. .......... 372/38.09
(Continued)

FOREIGN PATENT DOCUMENTS

JP          5-284128 A      10/1993
(Continued)

OTHER PUBLICATIONS

International Search Report for PCT/JP2006/304547, dated May 23, 2006.

*Primary Examiner* — Shuwang Liu
*Assistant Examiner* — Gina McKie
(74) *Attorney, Agent, or Firm* — RatnerPrestia

(57) ABSTRACT

A transmitting apparatus, receiving apparatus and communication system are disclosed, and great improvement in an S/N ratio, preventing an actual throughput from decreasing, and preventing the number of circuits for synchronizing spread spectrum signals from increasing can be expected at the receiving apparatus side. The transmitting apparatus includes a pulse generating circuit, pulse repetition cycle determining circuit, peak power determining circuit, and modulator. The pulse generating circuit generates pulse strings, pulse repetition cycle determining circuit determines, based on a clock signal, a pulse repetition cycle of the pulse string generated by the pulse generating circuit. The peak power determining circuit determines a pulse peak power of the pulse string. The modulator modulates the pulse string with transmission data, and then generates a transmission signal.

22 Claims, 9 Drawing Sheets

U.S. PATENT DOCUMENTS

| | | | |
|---|---|---|---|
| 6,898,262 B1 * | 5/2005 | Yokokawa | 377/47 |
| 7,164,722 B2 | 1/2007 | Takamura | |
| 7,301,989 B2 * | 11/2007 | Tamaki et al. | 375/146 |
| 2002/0018514 A1 * | 2/2002 | Haynes et al. | 375/130 |
| 2002/0101808 A1 * | 8/2002 | Seo | 369/59.11 |
| 2003/0194979 A1 * | 10/2003 | Richards et al. | 455/216 |
| 2004/0008729 A1 * | 1/2004 | Rogerson et al. | 370/478 |
| 2005/0162338 A1 * | 7/2005 | Ikeda et al. | 345/2.1 |
| 2007/0070853 A1 * | 3/2007 | Koishi | 369/59.11 |

FOREIGN PATENT DOCUMENTS

| | | |
|---|---|---|
| JP | 2003-60618 A | 2/2003 |
| JP | 2003-060618 A | 2/2003 |
| JP | 2003-143109 | 5/2003 |
| JP | 2004-510388 A | 4/2004 |
| JP | 2005-051466 | 2/2005 |
| JP | 2005-51466 A | 2/2005 |
| JP | 2006-87023 A | 3/2006 |
| JP | 2006-060854 | 6/2011 |
| WO | WO 02/27964 A1 | 4/2002 |

* cited by examiner decoded signal
(reception data)

TRANSMITTING APPARATUS, RECEIVING APPARATUS AND COMMUNICATION SYSTEM

This application is a U.S. National Phase Application of PCT International Application PCT/JP2006/304547.

TECHNICAL FIELD

The present invention relates to transmitting apparatus, receiving apparatus, and communication systems using wideband signals such as pulse waveforms.

BACKGROUND ART

Institute of Electrical and Electronics Engineers having its headquarter in the US has established IEEE802.11b standard which typically represents wireless local-area-network (hereinafter referred to as LAN) devices having been rapidly and widely used. On top of that, audio-video (hereinafter referred to as AV) devices and personal computers are connected in wireless manner, so that a society where seamless networks are established can be predicted. This background urgently needs a technique embodying a compact and high-speed wireless data device at an inexpensive cost. A distance measuring technique employing wireless techniques including ultrasonic sensors, or millimeter-wave sensors is one of the applications of the communications using this standard, and this technique is used in a variety of fields such as preventing a car collision, monitoring an invader by detecting a human-body. The application fields will be expanded from now on.

A wireless method called ultra wide band (hereinafter referred to as UWB), which employs pulse-like modulating signals, has drawn attention as one of techniques that can embody a compact device, high-speed data communication, and highly accurate distance measuring. The UWB employs a short pulse not greater than 1 (one) nano-second, and a wide frequency band over several hundreds of MHz for communication or distance measuring. In the communication, a repetition frequency of the short pulse is raised, so that one symbol is assigned to each one of short pulses or a plurality of short pulses, thereby embodying a high speed communication over several hundreds of Mbps. In the distance measuring, an arrival time is measured by using short pulses, so that a distance can be accurately measured.

FIG. 9 shows a block diagram illustrating a structure of a conventional receiving apparatus. Since the UWB employs an extraordinary short pulse not greater than 1 ns, a capture of a signal (acquisition) and a synchronization of a signal (tracking) should be done quickly and accurately. In this conventional instance, a signal is captured by a technique called synchronous addition which also suppresses errors in synchronization. A signal received via a wireless propagating route is deteriorated its signal-to-noise (S/N) ratio due to adverse effect of attenuation, noise, and multi-path.

To overcome this problem, a reception signal is delayed at known pulse intervals by using plural delay circuits 701A, 701B, and the delay is added in the form of voltage by using voltage adding circuit 702 for boosting the signal voltage. A sync pulse is extracted from this signal by using sync pulse detecting circuit 703. The reception signal is demodulated with this extracted sync pulse by demodulating circuit 704, thereby obtaining a demodulated signal (demodulated data). The foregoing structure is disclosed in, e.g. Unexamined Japanese Patent Publication No. H05-284128.

Although a description by using drawings is omitted here, use of a spread spectrum technique allows to a receiving apparatus to improve the S/N ratio of a signal sent from a transmitting apparatus due to spectrum gain for reception (demodulation). This conventional structure is disclosed in, e.g. Unexamined Japanese Patent Publication No. 2003-143109.

However, the conventional transmitting apparatus, receiving apparatus and communication system discussed above sometime encounter the following problems: Synchronous addition adds not only a reception signal but also noise power, so that improvement effect of S/N ratio is lowered. Use of the spread spectrum technique takes a time for synchronizing spectrum signals, so that an actual throughput can be lowered. On top of that, a number of circuits for synchronizing the spectrum signals are needed, which makes the circuit complicated. As a result, the device becomes bulky, and the power consumption becomes greater.

DISCLOSURE OF INVENTION

The present invention aims to provide a transmitting apparatus, receiving apparatus and communication system which allow the receiving apparatus to obtain greater S/N improvement effect, avoid lowering actual throughput, avoid requiring a large number of circuits for synchronizing spectrum signals, avoid making its circuit complicated, avoid making the device bulky, and avoid increasing the power consumption.

The transmitting apparatus of the present invention includes a pulse generating circuit, a pulse repetition cycle determining circuit, a peak power determining circuit, and a modulator. The pulse generating circuit generates a pulse string. The pulse repetition cycle determining circuit determines, based on a clock signal, a pulse repetition cycle of the pulse string generated by the pulse generating circuit. The peak power detecting circuit determines a pulse peak power of the pulse string. The modulator modulates the pulse string with transmission data, thereby generating a transmission signal.

The foregoing structure allows the receiving apparatus, i.e. the communication counterpart, to obtain greater improvement of S/N ratio, avoid lowering actual throughput, avoid requiring a large number of circuits for synchronizing spectrum signals, avoid making its circuit complicated, avoid making the device bulky, and avoid increasing the power consumption.

The transmitting apparatus of the present invention can have a structure in which a pulse repetition cycle and a pulse peak power are determined such that the cooperative operation of the pulse repetition cycle determination circuit with the peak power determination circuit makes an average power of a transmission signal constant. This structure allows transmitting pulses having a great peak power while the average transmission power is kept constant.

The transmitting apparatus of the present invention can have a structure in which a transmission signal is formed of at least two kinds of pulses having different peak powers from each other. This structure allows an appropriate transmission of signals the receiving apparatus needs.

The transmitting apparatus of the present invention can have a structure, in which the modulator allots at least a part of the sync information to a pulse having a great peak power. This structure allows the receiving apparatus to capture the pulse (acquisition) and hold the sync (tracking) with ease.

The transmitting apparatus of the present invention can have a structure, in which the modulator allots a signal, to be used for measuring a distance, to a pulse having a great peak power. This structure allows performing not only data communication but also measuring a distance with ease.

The transmitting apparatus of the present invention can have a structure, in which the modulator employs one of pulse position modulation, pulse phase modulation or pulse amplitude modulation. This simple structure allows performing a high-speed communication with short pulses or accurate distance measurement.

The transmitting apparatus of the present invention can further include a random number generating circuit for allowing the peak power determining circuit to determine the pulse peak power based on the generated ransom number. This structure can avoid a poor quality of communication such as interference in specific condition, and implement at least a communication or distance measurement with pulses having a great peak power.

The transmitting apparatus of the present invention can further include a timer circuit, and the peak power determining circuit determines a pulse peak power based on time intervals designated by the timer circuit. This structure allows the receiving apparatus to receive a pulse, having a great peak power, at given intervals, so that the arrival time of the pulse can be estimated with ease. As a result, the pulses can be easily caught, and the sync can be held with ease.

The transmitting apparatus of the present invention can have a structure in which at least one of the pulse repetition cycle determined by the pulse repetition cycle determining circuit or the pulse peak power determined by the peak power determining circuit can be changed based on the information received by the receiving apparatus. This structure allows the transmitting apparatus to establish an appropriate transmitting condition in response to a reception status.

The transmitting apparatus of the present invention can have a structure in which the information received by the receiving apparatus is the information indicating a reception status of a counterpart to which a transmission signal is sent. This structure allows the transmitting apparatus to establish an appropriate transmitting condition in response to the reception status of the counterpart.

The transmitting apparatus of the present invention can have a structure in which the information received by the receiving apparatus is the information from a device other than the counterpart to which a transmission signal is sent. This structure allows the transmitting apparatus to optimize a transmitting condition which can reduce the interference arising to other devices.

The receiving apparatus of the present invention includes a reception pulse signal generating circuit, selecting circuit, synchronizing circuit, and demodulating circuit. The reception pulse signal generating circuit reproduces short pulses based on reception signals, thereby generating reception pulse signals. The selecting circuit selects pulses based on a magnitude of pulse peak power of a reception pulse signal. The synchronizing circuit synchronizes a clock signal with the selected reception pulse signal, thereby generating a sync output signal. The demodulating circuit generates a demodulated signal by using the sync output signal and the reception pulse signal. The foregoing structure allows substantially improving an S/N ratio with pulses having a great pulse peak power, preventing the circuit from becoming complicated, preventing the device from becoming bulky, and preventing the power consumption from increasing.

The receiving apparatus of the present invention can have a structure in which the selecting circuit selects pulses having a great pulse peak power, and the synchronizing circuit synchronizes the clock signal with the pulse having a great pulse peak power, and the demodulating circuit receives and demodulates pulses having a small pulse peak power. This structure allows capturing pulses and holding a sync with ease, so that greater improvement of S/N ratio can be expected, and an actual throughput is not lowered, a number of spread signal sync circuits are not needed. As a result, the foregoing structure prevents the circuit from becoming complicated, and the device from becoming bulky, and the power consumption from increasing.

The receiving apparatus of the present invention can have a structure in which the selecting circuit selects pulses having a great pulse peak power, and the synchronizing circuit synchronizes spread signals with the selected pulses having a great pulse peak power. This structure allows synchronizing the spread signals with ease, and obtaining a greater improvement of S/N ratio, and an actual throughput is not lowered, a number of spread signal sync circuits are not needed. As a result, the foregoing structure prevents the circuit from becoming complicated, the device from becoming bulky, and the power consumption from increasing.

The receiving apparatus of the present invention can further include a time difference signal generating circuit, a signal flight distance estimating circuit. The time difference signal generating circuit generates a time difference signal based on the time difference between the clock signal and the reception pulse signal. The signal flight distance estimating circuit estimates the flight distance based on the time difference signal generated by the time difference generating circuit. This structure prevents the circuit from becoming complicated, the device from becoming bulky, and the power consumption from increasing, and the distance can be measured with ease.

The receiving apparatus of the present invention can have a structure in which the demodulating circuit obtains reception information of another device, and outputs the information to the transmitting apparatus. This structure allows conveying a reception status of the other device to the transmitting apparatus.

The receiving apparatus of the present invention can have a structure in which the obtained reception information of another device is the reception information of a counterpart to which the transmitting apparatus sends a transmission signal. This structure allows conveying the reception status of the communication counterpart to the transmitting apparatus.

The receiving apparatus of the present invention can have a structure in which the obtained reception information of another device is reception information of a device other than the counterpart to which the transmitting apparatus sends a transmission signal. This structure allows conveying information, e.g. about interference arising to another device, to the transmitting apparatus.

Figure 1:
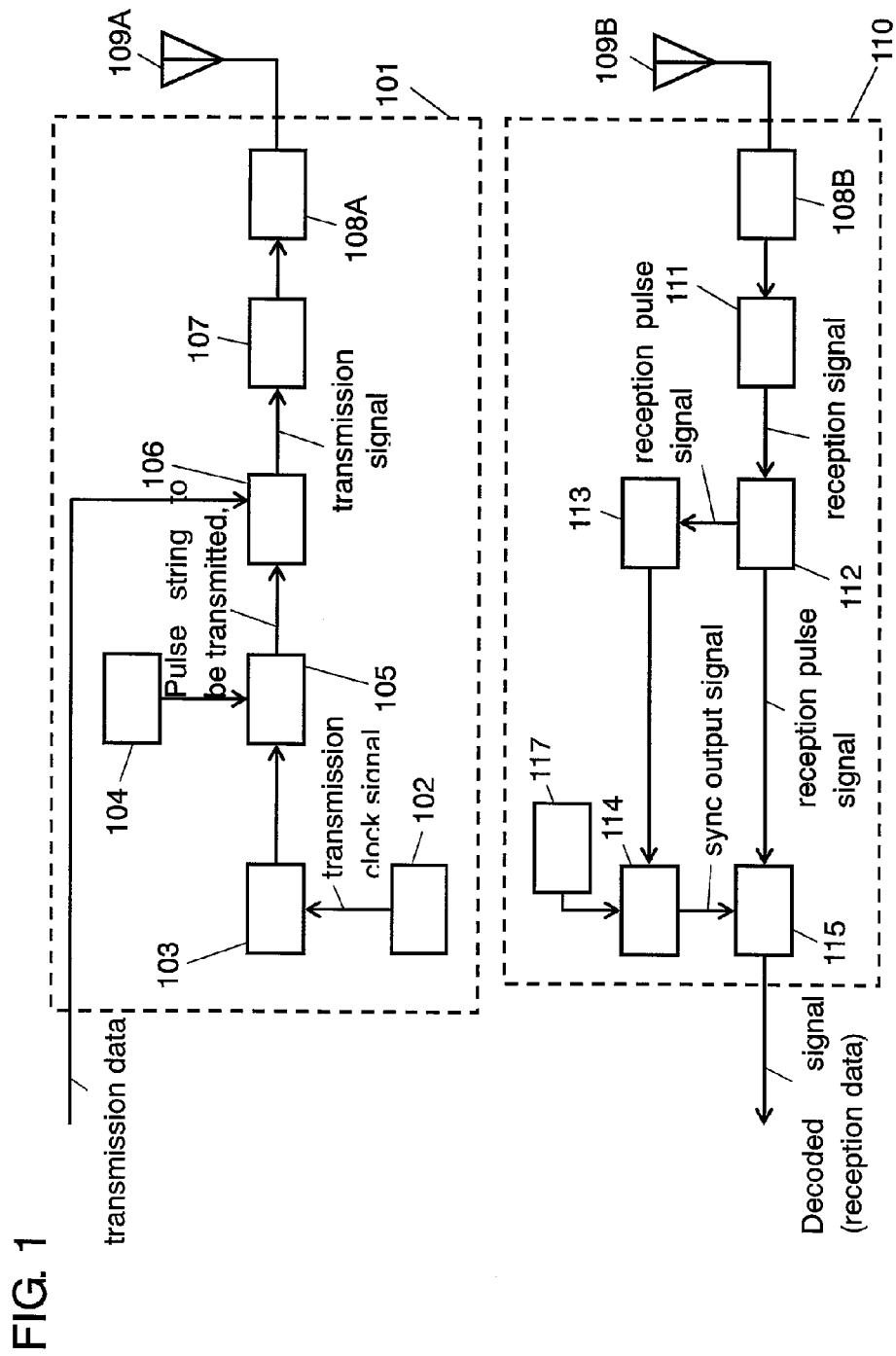
FIG. 1 shows a block diagram illustrating a structure of a communication system including a transmitting apparatus and a receiving apparatus in accordance with a first embodiment of the present invention.

DESCRIPTION OF REFERENCE MARKS 101, 201, 301, 401, 501A, 501B transmitting apparatus
102, 102A, 102B transmission clock circuit
103, 103A, 103B pulse repetition cycle determining circuit
104, 104A, 104B, 303 peak power determining circuit
105, 105A, 105B, 304, 315 pulse generating circuit
106, 106A, 106B, 305 modulator
107, 107A, 107B transmission adjusting circuit
108A, 108B, 108C, 108D band limiting filter
109A, 109B, 109C, 109D antenna
110, 203, 308, 502A, 502B receiving apparatus
111, 111A, 111B reception adjusting circuit
112, 112A, 112B, 204, 309 reception pulse signal generating circuit
113, 113A, 113B, 206, 310 clock reproducing circuit
114, 114A, 114B synchronizing circuit
115, 115A, 115B demodulating circuit
117 reception clock circuit
202 sync information extracting circuit
205 selecting circuit
302, 505 transmission data generating circuit
306 another device
307 object to be measured its flight distance
311 delay correcting circuit
312 delay-time calculating circuit
402 pulse peak power setting circuit
402A timer circuit
402B random timing generating circuit (random number generating circuit)
402C switcher
503A, 503B reception status estimating circuit
601A, 601B, 601C, 601D pulse having a small peak power
602 no-pulse existing position
603 pulse having a great peak power

DESCRIPTION OF PREFERRED EMBODIMENTS

Exemplary embodiments of the present invention are demonstrated hereinafter with reference to the accompanying drawings.

Embodiment 1

FIG. 1 shows a block diagram illustrating a structure of a communication system including a transmitting apparatus and a receiving apparatus in accordance with the first embodiment of the present invention. The communication system of the present information includes transmitting apparatus 101 and receiving apparatus 110. Transmitting apparatus 101 includes transmission clock circuit 102, pulse repetition cycle determining circuit 103, peak power determining circuit 104, pulse generating circuit 105, modulator 106, transmission adjusting circuit 107, and band limiting filter 108A.

Transmission clock circuit 102 generates transmission clock signals. Pulse repetition cycle determining circuit 103 determines a repetition cycle of pulses. Peak power determining circuit 104 determines a peak power of pulses. Pulse generating circuit 105 generates a pulse string to be transmitted. Modulator 106 modulates the transmission pulse string by using transmission data. Transmission adjusting circuit 107 adjusts transmission signals. Band limiting filter 108A limits a transmission band. Antenna 109A transmits the transmission signals.

Operation of the foregoing transmitter is demonstrated hereinafter with reference to FIG. 1. When pulse generating circuit 105 generates a pulse string to be transmitted, it uses a transmission clock signal generated by transmission clock circuit 102 as a reference signal. The repetition cycle determined by pulse repetition cycle determining circuit 103 and the pulse peak power determined by peak power determining circuit 104 are input to pulse generating circuit 105. The pulse repetition cycle of the transmission pulse string and the pulse peak power can be changed as required.

The pulse peak power can be determined based on the magnitude of transmission data information. Material information includes, e.g. communication requesting information, device recognizing information, sync information and so on. The pulse peak power can be also determined in response to the status of a communication path. The status of a communication path includes, e.g. intensity or density of multi-path wave.

Figure 2:
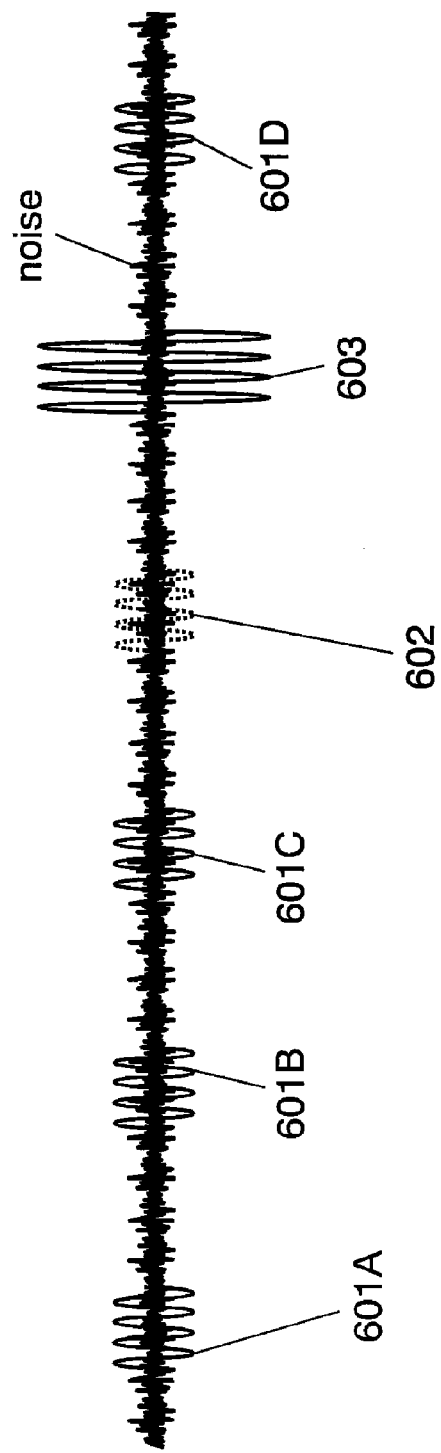
FIG. 2 shows pulse waveforms transmitted by the transmitting apparatus and received by the receiving apparatus in accordance with the first embodiment.

In this embodiment, a modulation method is not limited; however, a multi-path communication method is generally used. For instance, a pulse position modulation, pulse phase modulation or pulse amplitude modulation, or pulse-shape modulation can be used. Pulses having different peak powers are described by taking the pulse string shown in FIG. 2 as an example. FIG. 2 shows the waveform of pulses received by the receiving apparatus, which pulses are sent from the transmitting apparatus of the present invention.

In FIG. 2, pulses 601A-601D having small peak powers and pulses 603 having a great peak power coexist. For instance, communication requesting information is attached to pulse 603 having a great peak power, and communication information to be transmitted is attached to pulses 601A-601D having small peak powers. In this embodiment, a pulse having a great peak power and a pulse having a small peak power are used for the description purpose; however, the present invention is not limited to this instance, and as far as at least two kinds of pulses having different peak powers are available, the present invention can work.

The structure discussed above allows the device, which receives signals transmitted from transmitting apparatus 101, to demodulate pulses 603 having great peak powers at a higher S/N ratio than that of the demodulation of pulses 601A-601D having small peak powers, so that at least the communication requesting information can be received even if great noises and multi-path signals exist in the communication path. Position 602, where no pulses exist, has a purpose of outputting pulse 603 having a great peak power while an average transmission power is kept constant. In other words, position 602 is a time-concerned position where no pulses are output for this purpose.

No-pulse existing position 602 can be set either by changing a cycle of pulses at the cycle determination by pulse repetition cycle determining circuit 103, or by setting a peak power as small as nearly 0 (zero) by peak power determining circuit 104. As discussed above, the pulse repetition cycle determining circuit and the peak power determining circuit cooperate with each other for determining the pulse repetition cycle as well as the pulse peak power so that the average power of transmission signals can be constant.

The transmission signal generated by modulator 106 is adjusted its power by transmission adjusting circuit 107 and also adjusted its frequency band by band limiting filter 108A before the signal is transmitted from antenna 109A. Transmission adjusting circuit 107 can have such a structure as not only adjusts the power with an amplifier or an attenuator, but also converts the frequency of the transmission signal into a signal at any frequency band by using a frequency conversion circuit such as a local oscillator combined with a mixer and a switch, or an oscillator for direct conversion.

Receiving apparatus 110 includes band limiting filter 108B, reception adjusting circuit 111, reception pulse signal generating circuit 112, clock reproducing circuit 113, synchronizing circuit 114, and demodulating circuit 115. Band limiting filter 108B removes unnecessary signals, existing out of the band, from the signals received by antenna 109B. Reception adjusting circuit 111 adjusts the power of a signal received. Reception pulse signal generating circuit 112 shapes the pulses of the reception signal. Clock reproducing circuit 113 extracts sync signals from the reception pulse signals. Synchronizing circuit 114 generates a sync output signal having undergone the sync adjustment with the reception clock signal generated by reception clock circuit 117. Demodulating circuit 115 outputs a demodulated signal, i.e. reception data.

Operation of the foregoing receiving apparatus is demonstrated hereinafter. A signal caught by antenna 109B is removed its unnecessary signals existing out of the band by band limiting filter 108B, then is adjusted its power by reception adjusting circuit 111. Similar to transmission adjusting circuit 107 discussed previously, reception adjusting circuit 111 not only adjusts the power but also removes radio-frequency component with sync detection using a low pass filter (LPF), a local oscillator and a mixer, an envelop detector, or a correlated template, or delayed detection using delay-correlation. The reception signal adjusted by reception adjusting circuit 111 is input to reception pulse signal generating circuit 112.

Reception pulse signal generating circuit 112 shapes the pulses of the reception signal for clock reproduction or demodulation. Pulse-shaping can be done by, e.g. extracting signal components by using a comparison circuit or oversampling, or by adjusting a pulse width. Circuit 112 outputs a reception pulse signal, and is supplied to demodulating circuit 115 and clock reproducing circuit 113, which then extracts a sync signal. Synchronizing circuit 114 generates a sync output signal having undergone sync adjustment with a reception clock signal supplied from reception clock circuit 117. The sync output signal undergoes demodulation in demodulating circuit 115, which then outputs a demodulated signal, i.e. reception data.

During the foregoing operation of receiving apparatus 110, as it is described in the operation of transmitting apparatus 101, a reception signal, running through a path where great noises and great multi-path signals exist, has a low S/N ratio. Thus when reception adjusting circuit 111 implements a signal detection by using the comparison circuit, noise components are erroneously recognized as signal components, or the signal components tend to be missed because of small difference between a comparison reference voltage and a noise voltage, so that a reception signal having many errors can be generated.

On the other hand, the difference between the comparison reference signal and the noise voltage can be greater in the pulse having a great peak power, so that a reception signal having a fewer errors can be generated. Clock reproducing circuit 113 can obtain accurate reception data including pulses having small peak powers by selecting a pulse having a great peak power and making the pulse as a reference.

As discussed above, the transmitting apparatus, receiving apparatus and communication system in accordance with this first embodiment allow an appropriate change in a pulse repetition cycle of a transmission signal and in peak powers of respective pulses at the transmitting apparatus, so that the receiving apparatus can obtain greater improvement in the S/N ratio, avoid lowering actual throughput, avoid requiring a large number of circuits for synchronizing spectrum signals, avoid making its circuit complicated, allow capturing pulses and holding synchronization with ease, and embody a compact device as well as a low power consumption.

Figure 3:
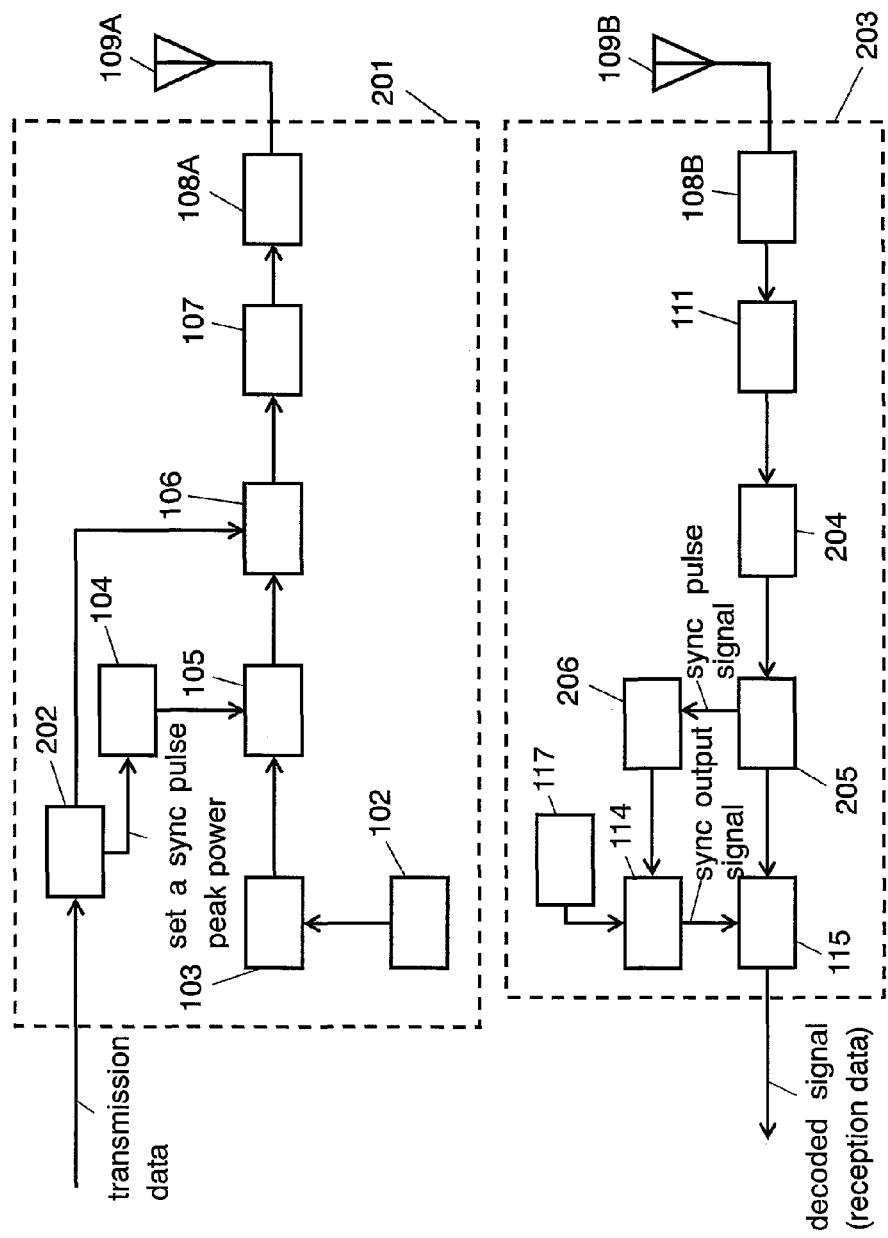
FIG. 3 shows a block diagram illustrating another structure of a communication system including a transmitting apparatus and a receiving apparatus in accordance with the first embodiment of the present invention.

In the foregoing discussion, information attached to the pulse having a great peak power is not specifically designated. Hereinafter, however, the case where sync information is attached to the pulse is described with reference to FIG. 3 which shows a block diagram illustrating another structure of a communication system including a transmitting apparatus and a receiving apparatus in accordance with the first embodiment of the present invention. The communication system of this embodiment includes transmitting apparatus 201 and receiving apparatus 203. In FIG. 3, similar elements to those in FIG. 1 have the same reference marks, and the descriptions thereof are omitted here. In this case, transmitting apparatus 201 includes sync information extracting circuit 202, and receiving apparatus 203 includes selecting circuit 205. Reception pulse signal generating circuit 204 generates reception pulse signals by using outputs from reception adjusting circuit 111, and the reception pulse signals are supplied to selecting circuit 205. Clock reproducing circuit 206 receives sync pulse signals from selecting circuit 205, and then reproduces the clock signal.

In the transmitting apparatus, receiving apparatus and communication system discussed above, when the sync information is generated, e.g. as parts of transmission data, the transmission data input to transmitting apparatus 201 is supplied to sync information extracting circuit 202 for extracting a timing of the sync information, and based on this timing, peak power determining circuit 104 determines a peak power of a pulse. Receiving apparatus 203 includes selecting circuit 205, which selects only the pulse having a great peak power, and to which pulse the sync information is attached. Selecting circuit 205 generates a sync pulse signal for reproducing the clock signal. This structure allows receiving apparatus 203 to obtain accurate sync timing, so that reception pulse signals can be sampled at accurate sync timing. As a result, reception pulse signals having a small S/N ratio can be demodulated with fewer errors.

In the foregoing discussion, a clock signal is synchronized by using a pulse having a great peak power; however, the present invention is not limited to this instance, and is applicable to the following case: both of the transmitting apparatus and the receiving apparatus have a function of spread spectrum communication, and a start-time position of a spectrum signal is attached to the pulse having a great peak power, so that a code-synchronization can be done in a short time.

Figure 4:
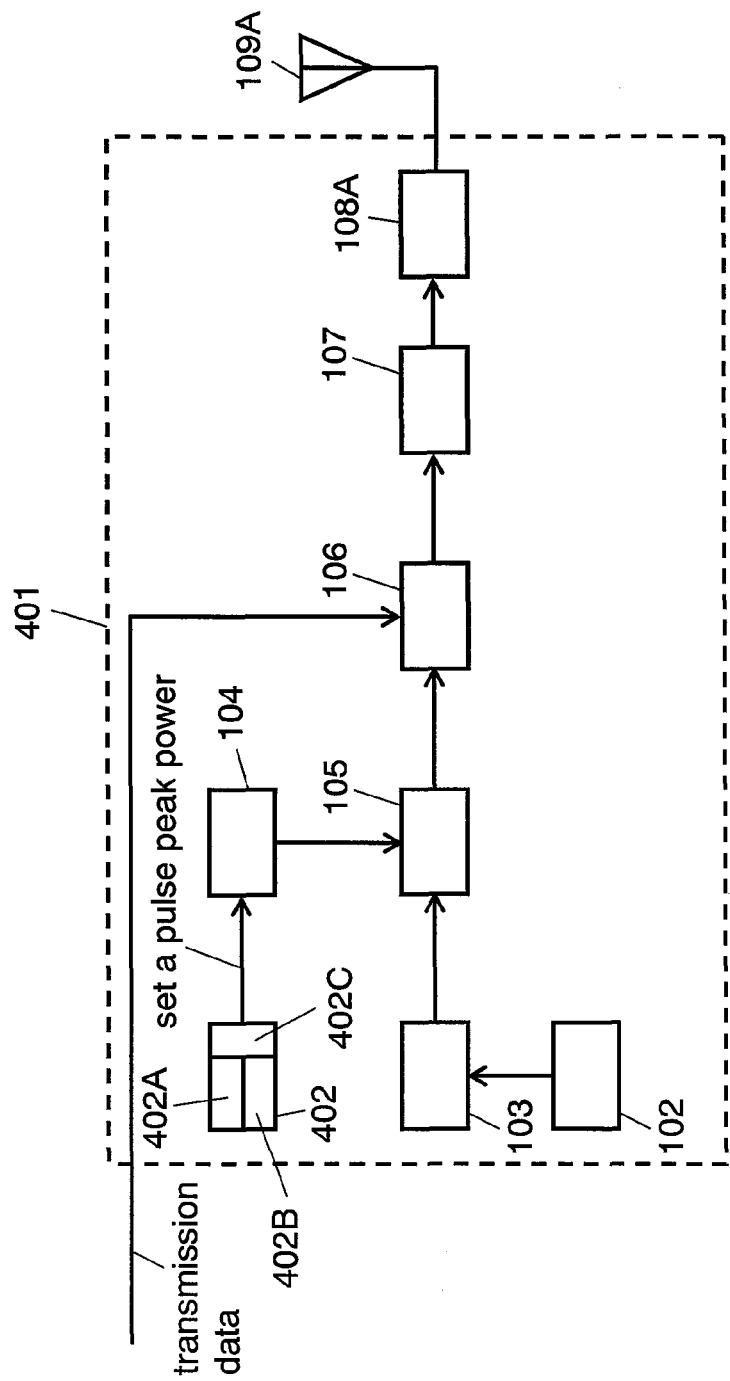
FIG. 4 shows a block diagram illustrating a structure of the transmitting apparatus in accordance with the first embodiment of the present invention.

In the foregoing discussion, the information specifically selected such as sync information is attached to the pulse having a great peak power. However, the structure shown in FIG. 4 allows attaching the pulse having a great peak power to the peak power determining circuit regardless of transmission data. FIG. 4 shows a block diagram illustrating another structure of the transmitting apparatus in accordance with the first embodiment. In FIG. 4, similar elements to those in FIG. 1 have the same reference marks and the descriptions thereof are omitted here. In FIG. 4, transmitting apparatus 401 includes pulse peak power setting circuit 402, which sets timing, and based on this timing, peak power determining circuit 104 attaches the pulse having a great peak power.

Pulse peak power setting circuit 402 is, e.g. timer circuit 402A which sets pulses with a great peak power at given intervals, or random-timing generating circuit 402B which generates random numbers in a random-number generating circuit, an then sets pulses having a great peak power at random. For instance when timer circuit 402A is employed, the receiving apparatus can receive pulses with a great peak power at given intervals, so that an arrival time of a pulse can be estimated with ease. As a result, pulses can be captured (acquisition) and sync can be held (tracking) with ease. Use of random timing generating circuit 402B allows the receiving apparatus to avoid canceling out of cyclic signals by a specific multi-path environment, or to avoid consistent interference between the cyclic signals and other cyclic signals generated by another device. As a result, the receiving apparatus can capture pulses (acquisition) and hold synchronization (tracking) with fewer errors.

Here is another method to achieve the foregoing advantages: first, timer circuit 402A cyclically sends pulses having a great peak power to the receiving apparatus, and when the receiving apparatus encounters the multi-path environment or the interference with another device discussed above, switcher 402C switches over timer circuit 402a to random-timing generating circuit 402B.

In the foregoing discussion, both of the transmitting apparatus and the receiving apparatus include a clock circuit individually; however, when the transmitting apparatus is placed closely to the receiving apparatus, a transmission clock circuit can be used as a reception clock circuit as well.

Figure 5:
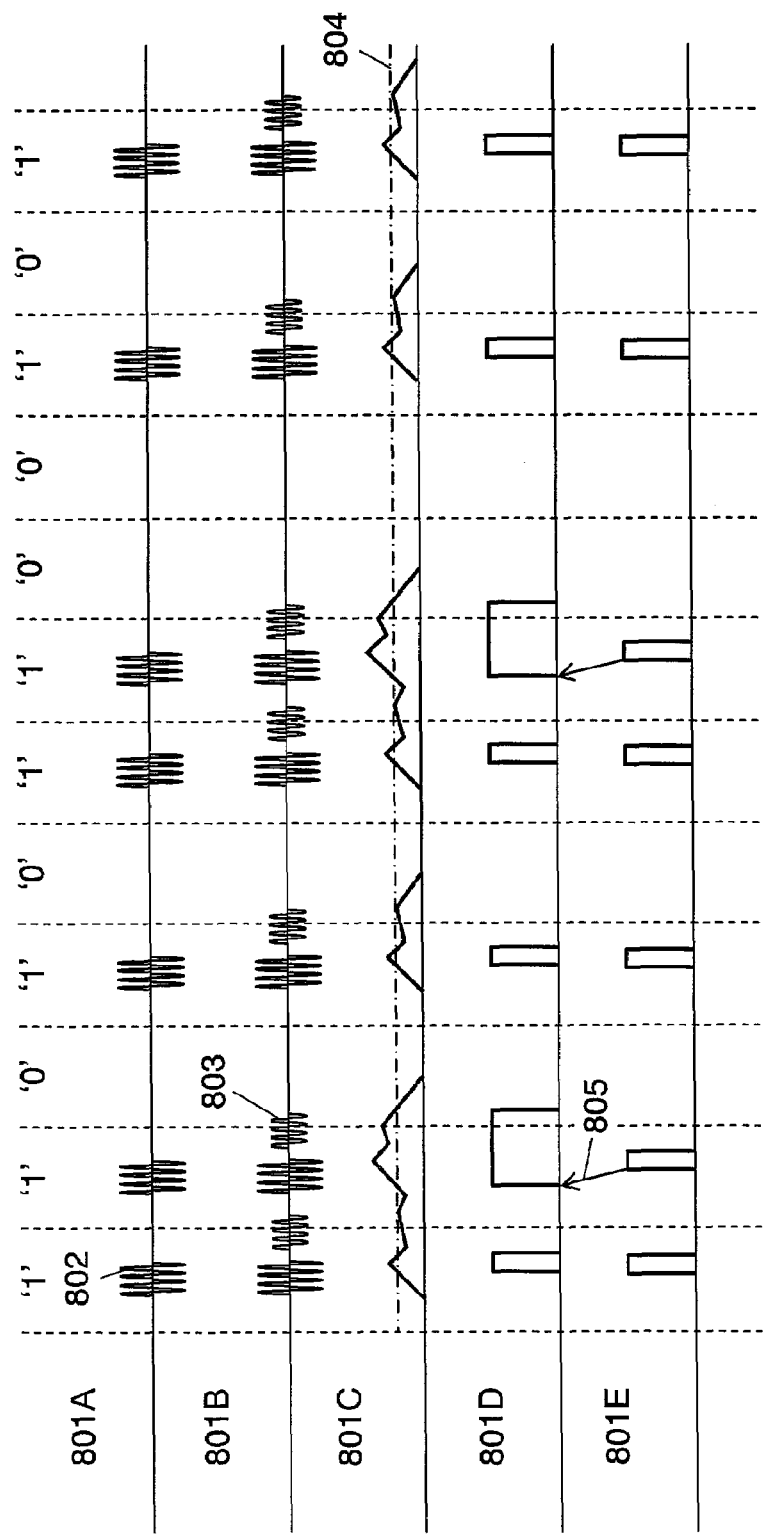
FIG. 5 shows another pulse waveforms transmitted by the transmitting apparatus and received by the receiving apparatus in accordance with the first embodiment.

In the foregoing discussion, cycles and peak powers of pulses can be changed in response to the magnitude of communication information; however, these two factors can be determined in response to the status of the communication path as discussed previously. Hereinafter changes in cycles or peak powers of pulses in response to the communication path status, e.g. intensity or density of multi-path wave, are demonstrated with reference to FIGS. 5 and 6, which show another pulse waveform transmitted from the transmitting apparatus and received by the receiving apparatus. Transmission signal 801A having undergone OOK (on-off keying) modulation, and the presence of pulse 802 indicates "1" and no pulse 802 indicates "0".

Reception signal 801B is accompanied by multi-path wave 803. Signal 801C indicates that reception signal 801B undergoes envelope detection. Signal 801C having undergone the detection is evaluated with a given threshold 804, and a signal greater than threshold 804 is evaluated as "1" and a signal smaller than threshold 804 is evaluated as "0". Signal 801D is a binary signal having undergone A/D conversion, and indicates "1" when a signal over threshold 804 is input, and indicates "0" when a signal lower than threshold 804 is input. Signal 801E is produced in an ideal condition such as undergoing A/D conversion without multi-path. Comparison between signals 801D and 801E will find detected timing difference 805.

This detected timing difference 805 is caused by interference between symbols due to multi-path wave 803, and thus a pulse waveform is distorted. Occurrence of timing difference 805 will increase errors in demodulation because jitters increase in the sync tracking implemented based on signal 801D having undergone the A/D conversion. When the jitters increase, sync pull-in cannot be done or the pulled-in sync becomes out of sync, so that communication quality becomes substantially lowered.

Figure 6:
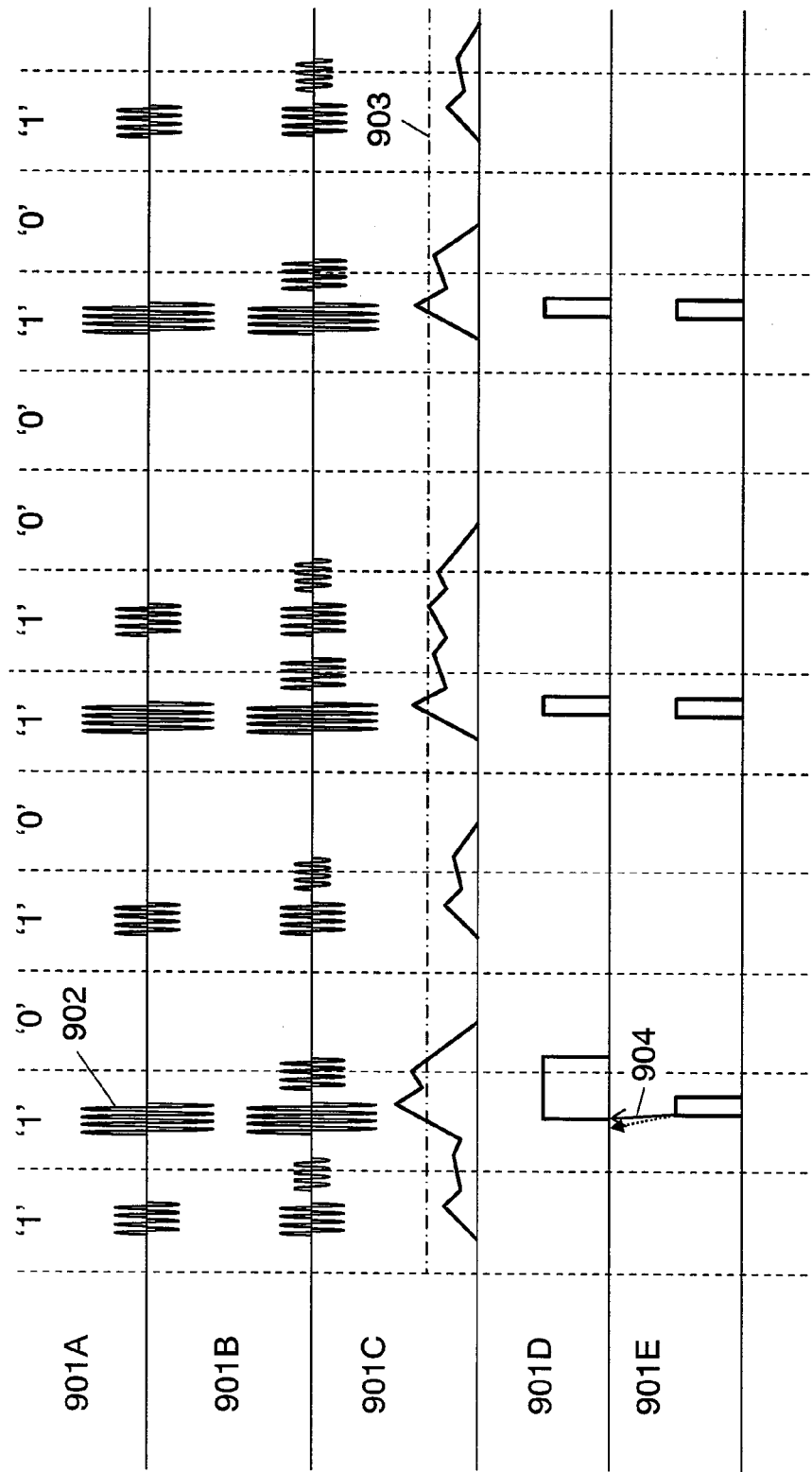
FIG. 6 shows another pulse waveforms transmitted by the transmitting apparatus and received by the receiving apparatus in accordance with the first embodiment.

As shown in FIG. 6, coexistence of pulse 902 having a great peak power with the transmission signal will overcome the problem discussed above. The following embodiment is an instance of this case: Transmission signal 901A includes pulses 902 having a great peak power, e.g. once in four times. Similar to the case shown in FIG. 5, reception signal 901B accompanied by multi-path wave undergoes the envelope detection. Signal 901C having undergone the detection is evaluated with threshold 903, which can be greater than threshold 804 shown in FIG. 5. Signal 901D having undergone A/D conversion has a fewer number of pulses than signal 801D shown in FIG. 5, however, its timing difference (shown in the solid line arrow mark) from signal 901E having no multi-path is smaller than that (shown in the broken line arrow mark) shown in FIG. 5.

The foregoing advantage is produced with this reason: Pulse 902 having a great peak power receives less in-between-symbols interference from the previous pulse, so that it is less affected by the interference, and the pulse waveform is less distorted. As discussed above, insertion of pulses having a great peak power to the reception signal at given intervals allows preventing communication quality from lowering even in a multi-path environment, and allows implementing sync pull-in within a short time as well as accurate sync tracking. The insertion of the pulses having a great peak power can take place when sync jitters are evaluated by a reception status estimating circuit and the evaluated jitters exceed a given threshold value. Plural threshold values can be prepared for the insertion cycle and the power of pulses to be inserted, and when jitters are found great, pulses having a greater power are inserted at a shorter cycle.

Embodiment 2

Figure 7:
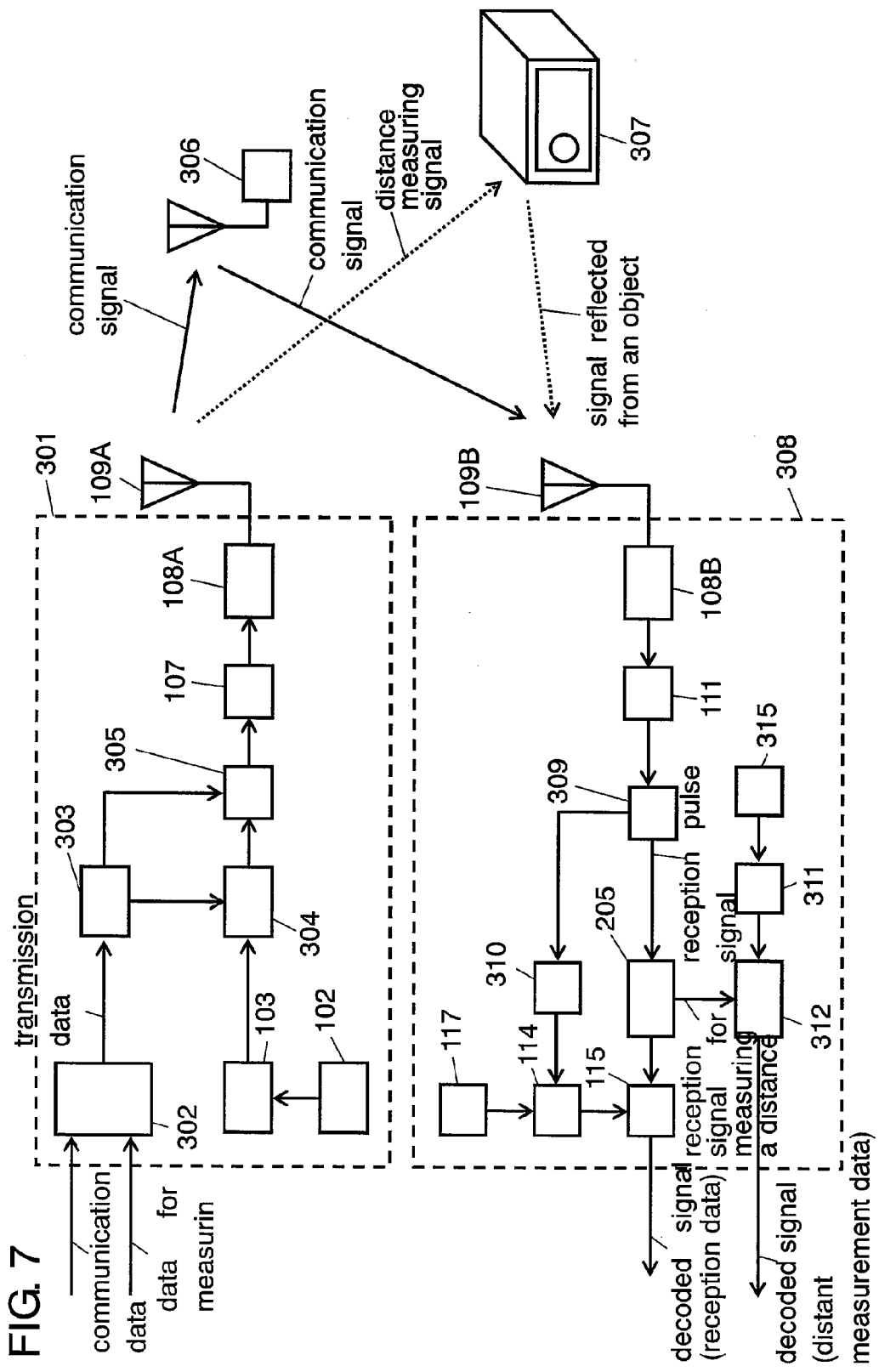
FIG. 7 shows a block diagram illustrating a structure of a communication system including a transmitting apparatus and a receiving apparatus in accordance with a second embodiment of the present invention.

FIG. 7 shows a block diagram illustrating a structure of a communication system including a transmitting apparatus and a receiving apparatus in accordance with the second embodiment of the present invention. This second embodiment differs from the first one in the structure having a distance measuring function in addition to the communication function. The communication system in accordance with the second embodiment includes transmitting apparatus 301 and receiving apparatus 308.

Similar to the first embodiment, transmitting apparatus 301 transmits pulses having a great peak power mixed with pulses having a small peak power by using peak power determining circuit 303. In this case, data for measuring a distance is attached to the pulses having a great power, and data for communication is attached to the pulses having a small power. In the following discussion, an instance, where only the data for measuring a distance is attached to the pulses having a great power, is described. The present invention, however, is applicable both to the distance measurement and the communication by attaching not only the data for measuring a distance but also attaching information to be used for communication, e.g. sync data, to the pulses having a great peak power.

The data for communication and the data for measuring a distance are input to transmission data generating circuit 302, and are output as transmission data, which is then supplied to peak power determining circuit 303, where a peak power is determined so as to be timed to both of the foregoing data. The peak power is input to pulse generating circuit 304, which then outputs pulses having different peak powers. The two data are input together to modulator 305, where they are modulated by an appropriate modulating method into transmission signals, then the signals run through transmission adjusting circuit 107 and band limiting filter 108A before being transmitted by antenna 109A.

A communication signal is received by another device 306, which performs as a communicating device and processes the signal accordingly. The signal is returned to antenna 109B of receiving apparatus 308, and runs through band limiting filter 108B, reception adjusting circuit 111, then is supplied as a reception signal to reception pulse generating circuit 309. The reception pulse signal generated by circuit 309 runs through clock reproducing circuit 310, synchronizing circuit 114, and is supplied to as a sync output signal to demodulating circuit 115, which then outputs a demodulated signal (reception data).

Next, the distance measurement is demonstrated hereinafter. A signal reflecting from object 307 is used for measuring the distance to object 307. A signal for measuring the distance is transmitted from transmitting apparatus 301, and arrives at object 307, then reflects from object 307 and is caught as a reflected signal by antenna 109B of receiving apparatus 308. Similar to the communication signal, this reflected signal is output as a reception pulse signal from reception pulse signal generating circuit 309; however, it is selected by selecting circuit 205, and is output as a reception distance measuring signal.

There are several selecting methods available, e.g. a simple method is to use a power difference between the reception pulse signals, or to use a spread code in the data for measuring a distance and another spread code in the data for communication, or to estimate an arrival time of the reflected signal of the distance measurement data based on a transmission time spent by the transmitting apparatus. Delay-time calculating circuit 312 includes a time-difference signal generating circuit which generates a time-difference signal by using a time difference between a clock signal and a reception pulse signal, and a signal flight distance estimating circuit which estimates a signal flight distance by using the time difference signal. A reception measuring signal selected by selecting circuit 205 is input to delay-time calculating circuit 312, which calculates a time difference from the transmission signal for finding a distance, then circuit 312 outputs the distance as a decoded signal (measured distance). In this case, a signal generated by pulse generating circuit 315 is adjusted by delay correcting circuit 311 which corrects the delay time, and then the adjusted signal is used as the transmission signal.

As discussed above, the transmitting apparatus, receiving apparatus and communication system in accordance with the second embodiment of the present invention appropriately change a pulse repetition cycle of a transmission signal and the peak powers of respective pulses for measuring a distance to an object by using a signal having a great peak power, and implement a communication with another device by using a signal having a small peak power, so that this embodiment allows a simple circuit structure to implement both of communication and distance measurement.

In the foregoing description, a distance is calculated based on the time difference between the transmission signal and the signal reflecting from the object; however, the distance can be calculated based on the time difference between the transmission signal and a reply from a communication counterpart provided that a time duration from the reception to the reply is a known factor.

Embodiment 3

Figure 8:
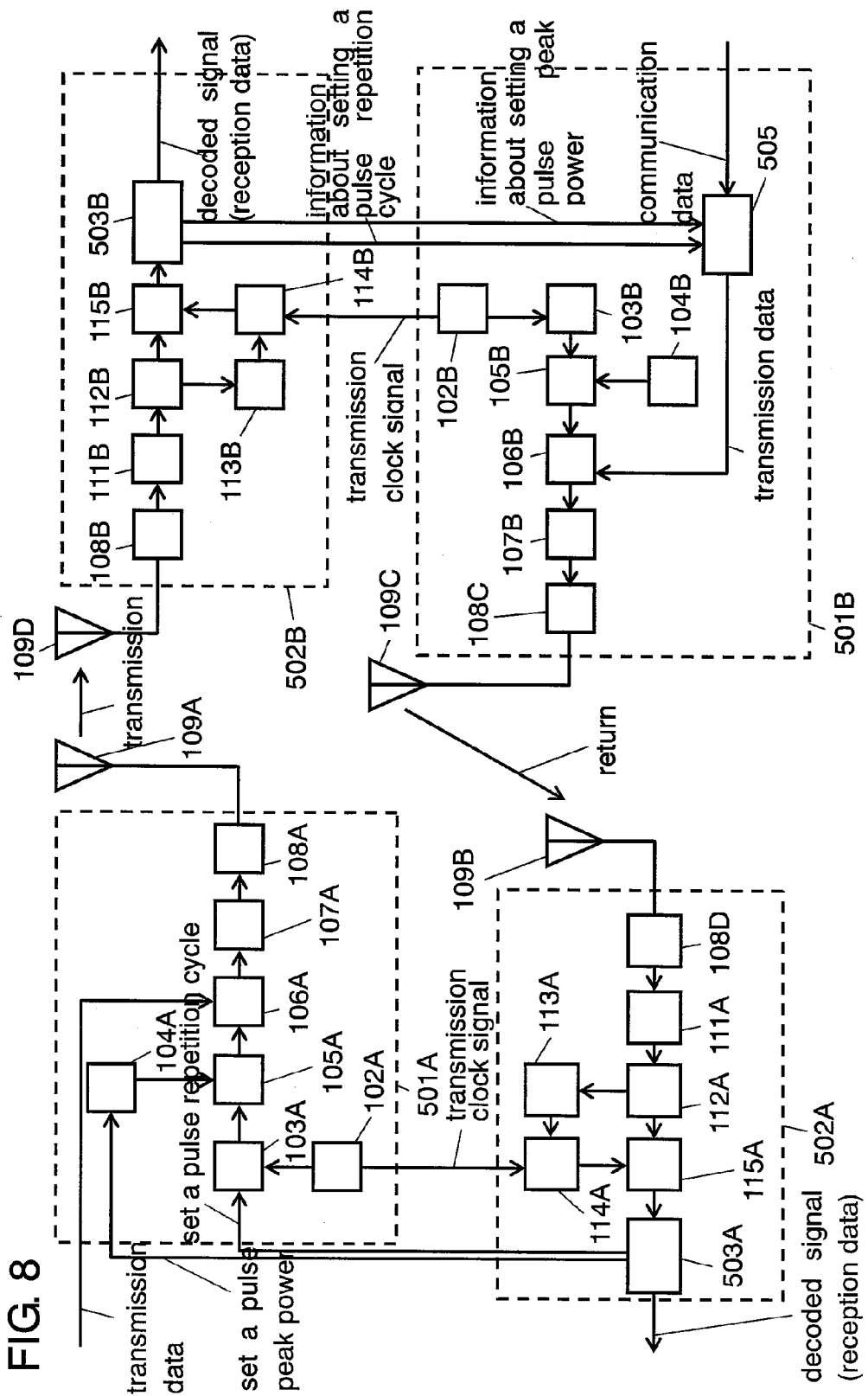
FIG. 8 shows a block diagram illustrating a structure of a communication system including a transmitting apparatus and a receiving apparatus in accordance with a third embodiment of the present invention.
Figure 9:
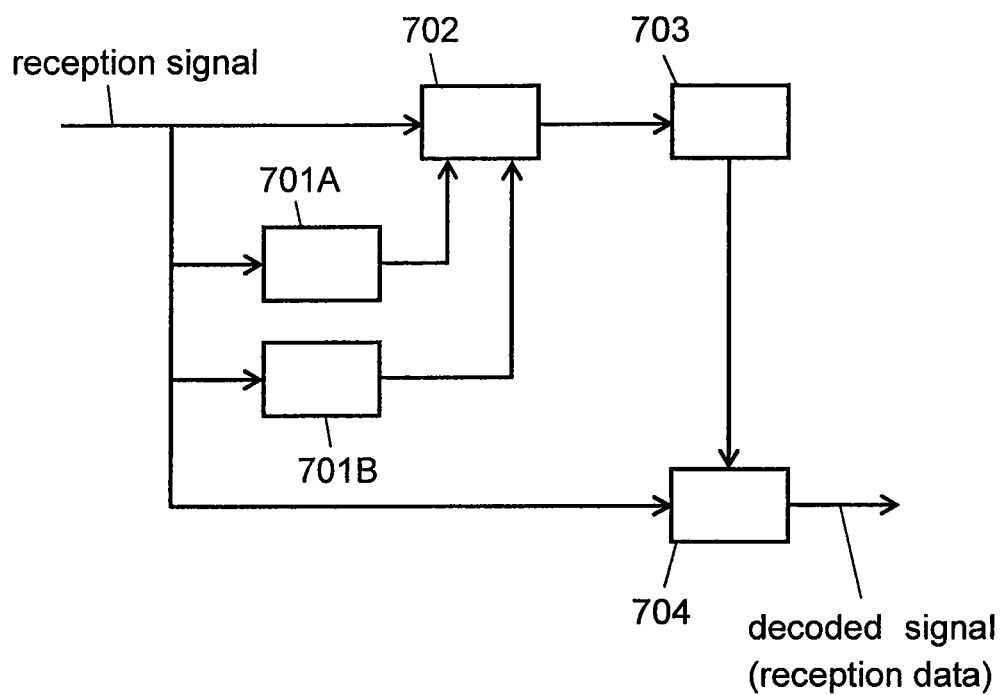
FIG. 9 shows a block diagram illustrating a structure of a conventional receiving apparatus.

FIG. 8 shows a block diagram illustrating a structure of a communication system including transmitting apparatus and receiving apparatus in accordance with the third embodiment of the present invention. This third embodiment differs from the first one in the transmitting apparatus which, in response to the request from the receiving apparatus, can adjust at least one of a pulse repetition cycle or a pulse peak power.

In FIG. 8, a combination of transmitting apparatus 501A and receiving apparatus 502A indicates the communication system which mainly implements the transmission. A combination of transmitting apparatus 501B and receiving apparatus 502B indicates the communication system which mainly implements the reception. These systems are generally similar to the structure shown in the first embodiment. Transmission clock circuits 102a-102b are similar to transmission clock circuit 102 of the first embodiment, and pulse repetition cycle determining circuits 103a-103b are similar to pulse repetition cycle determining circuit 103. Peak power determining circuits 104a-104b are similar to peak power determining circuit 104. Pulse generating circuits 105a-105b are similar to pulse generating circuit 105.

Modulators 106a-106b are similar to modulator 106, and transmission adjusting circuits 107a-107b are similar to circuit 107. Band limiting filters 108c-108d are similar to filters 108a-108b, and antenna 109c-109d are similar to antenna 109a-109b. Reception adjusting circuits 111a-111b are similar to circuit 111, and reception pulse signal generating circuit 112a-112b are similar to circuit 112. Clock reproducing circuits 113a-113b are similar to circuit 113, and synchronizing circuits 114a-114b are similar to circuit 114. Demodulating circuit 115a-115b are similar to demodulating circuit 115.

The different point is that reception status estimating circuits 503A and 503B are provided in this third embodiment. Receiving apparatus 502B receives a signal sent from transmitting apparatus 501A, and estimates a reception status of an output from demodulating circuit 115B with reception status estimating circuit 503B, or estimates the reception status based on, e.g. an average value of changes in phases of sync output signal generated by synchronizing circuit 114B. In response to the estimated reception status, receiving apparatus 502 determines its own pulse repetition cycle and pulse peak power, and then returns these values.

In the case of returning, an acknowledgement signal (hereinafter referred to simply as "ACK") is used for continuing the communication, or a signal is used for informing whether or the present repetition cycle synchronizes with a pulse peak power. The information estimated by circuit 503B about setting the pulse peak power or the pulse repetition cycle is attached to the transmission data via transmission data generating circuit. Reception status estimating circuit 503A of receiving apparatus 502A, which receives the return, obtains the information about reception status of the communication counterpart, and when the information is, e.g. ACK signal, the communication is continued with the repetition cycle and the peak power being kept. When the information contains a signal notifying receiving apparatus 502A of a reception with a low power, the repetition cycle is lowered for increasing the pulse peak power so that receiving apparatus 502B can receive pulses having a greater peak power. When the information contains a signal notifying receiving apparatus 502A of a reception with an excessive power, the peak power is lowered.

If the data rate to be processed by receiving apparatus 502B is high, the pulse repetition cycle is increased, and if the data late is low, the cycle is decreased. The pulse repetition cycle from transmitting apparatus 501A at its initial stage to receiving apparatus 502B can be sent based on a predetermined initial value, or either one of the transmitting apparatus or the receiving apparatus can change its established value in order to agree with that of the counterpart.

As discussed above, the transmitting apparatus, receiving apparatus, and communication system of the present invention appropriately change, in response to a reception status of the communication counterpart, at least one of the pulse repetition cycle of a transmission signal or a peak power of respective pulses for the communication. The present invention thus allows tracking pulses, holding synchronization, downsizing the device, and lowering the power consumption with a simple circuit structure.

In the foregoing discussion, reception status estimating circuit 503A detects a signal supplied from transmitting apparatus 501B, i.e. communication counter part, and obtains the information about reception status. However, the present invention is not limited to this instance. For instance, circuit 503A detects radio-wave supplied from another device which shares the frequency band with the communication system, and the repetition cycle or the peak power can be changed not to interfere with the radio-wave.

INDUSTRIAL APPLICABILITY

A communication system including a transmitting apparatus and a receiving apparatus of the present invention comprises the following elements: The transmitting apparatus includes a pulse generating circuit, pulse repetition cycle determining circuit, peak power determining circuit, and modulator. The receiving apparatus includes a reception pulse signal generating circuit, selecting circuit, synchronizing circuit, and demodulating circuit. The pulse generating circuit generates pulse strings, and the pulse repetition cycle determining circuit determines, based on a clock signal, the pulse repetition cycle of the pulse strings generated by the pulse generating circuit.

The peak power determining circuit determines the pulse peak power of the pulse strings generated by the pulse generating circuit. The modulator modulates the pulse strings with transmission data, thereby generating a transmission signal. The reception pulse signal generating circuit reproduces short pulses based on a reception signal, thereby generating a reception pulse signal. The selecting circuit selects pulses based on amounts of pulse peak powers of the reception pulse signals. The synchronizing circuit synchronizes a clock signal with the signal selected by the selecting circuit, thereby generating a sync output signal.

The demodulating circuit generates a demodulated signal by using the sync output signal and the reception pulse signal supplied from the selecting circuit. This structure allows the receiving apparatus advantageously to obtain greater improvement in S/N ratio, to prevent an actual throughput from lowering, to suppress the quantity of spread spectrum sync circuits, to prevent the circuit from becoming complicated, to prevent the device from becoming bulky, and to prevent the power consumption from increasing. The present invention is useful for a transmitting apparatus, receiving apparatus and communication system using a wideband signal, e.g. a pulse waveform.

The invention claimed is:

1. A transmitting apparatus comprising:
    a pulse generating circuit for generating a pulse string including large pulses and small pulses, the large pulses having greater pulse peak power than the small pulses, the large pulses having greater pulse peak power than the small pulses;
    a pulse repetition cycle determining circuit for determining a pulse repetition cycle of the pulse string;
    a peak power determining circuit for determining a pulse peak power of the large pulses and the small pulses in the pulse string,
    wherein the pulse peak power of the pulses is determined based on a type of transmission data being transmitted or based on status of a wireless communication path through which the transmission data is transmitted; and
    a modulator for modulating the pulse string with the transmission data for generating a radio frequency (RF) transmission signal,
    wherein the pulse repetition cycle determining circuit and the peak power determining circuit determine the pulse repetition cycle and the pulse peak power so that the large pulses are transmitted at an interval that is controlled based on the type of transmission data or the status of the wireless communication path so that an average power of the RF transmission signal is constant.

2. The transmitting apparatus of claim 1, wherein the modulator allots at least a part of sync information to one of the large pulses having said greater pulse peak power.

3. The transmitting apparatus of claim 1, wherein the modulator allots a signal to be used for measuring a distance to one of the large pulses having said greater pulse peak power.

4. The transmitting apparatus of claim 1, wherein the modulator employs one of pulse position modulation, pulse phase modulation, and pulse amplitude modulation as a modulating method.

5. The transmitting apparatus of claim 1 further comprises a random number generating circuit for generating a random number, wherein the peak power determining circuit determines, based on the random number, said greater pulse peak power of one of the large pulses.

6. The transmitting apparatus of claim 1 further comprises a timer circuit for designating a time interval, wherein the peak power determining circuit determines the pulse peak power based on the designated time interval.

7. The transmitting apparatus of claim 1, wherein the transmitting apparatus changes, based on information received by a receiving apparatus, at least one of a pulse repetition cycle determined by the pulse repetition cycle determining circuit and a pulse peak power determined by the peak power determining circuit.

8. The transmitting apparatus of claim 7, wherein information received by the receiving apparatus indicates a reception status of a communication counterpart device to which the transmission signal is sent.

9. The transmitting apparatus of claim 7, wherein information received by the receiving apparatus is sent from a device other than the communication counterpart device to which the transmission signal is sent.

10. A receiving apparatus comprising:
    a reception pulse signal generating circuit for generating a reception pulse signal based on a radio frequency (RF) reception signal including large pulses and small pulses, the large pulses having greater pulse peak power than the small pulses, wherein the large pulses are received by the receiving apparatus at an interval that is controlled based on a type of transmission data or a status of a wireless communication path between a transmitting apparatus transmitting the pulses and the receiving apparatus receiving the pulses so that an average power of the RF reception signal is constant, and;

a selecting circuit for selecting one of the large pulses as a reference pulse having a maximum pulse peak power of the reception pulse signal;

a synchronizing circuit for synchronizing a clock signal with the one of the large pulses selected by the selecting circuit, and then generating a sync output signal; and a demodulating circuit for generating a demodulated signal by using the sync output signal supplied from the synchronizing circuit and the one of the large pulses supplied from the selecting circuit.

11. The receiving apparatus of claim 10, wherein the selecting circuit selects a pulse having said greater pulse peak power, and the synchronizing circuit synchronizes the clock signal with the pulse selected by the selecting circuit and having said greater pulse peak power, and the demodulating circuit receives and demodulates a pulse having small pulse peak power of the small pulses.

12. The receiving apparatus of claim 10, wherein the selecting circuit selects a pulse having said greater pulse peak power, and the synchronizing circuit synchronizes a spread signal with the pulse selected by the selecting circuit and having said greater pulse peak power.

13. The receiving apparatus of claim 10 further comprising:
a time difference signal generating circuit for generating a time difference signal based on a time difference between the clock signal and the reception pulse signal; and
a signal flight distance estimating circuit for estimating a flight distance of a signal by using the time difference signal.

14. The receiving apparatus of claim 10, wherein the demodulating circuit obtains reception information about another device, and outputs the information to a transmitting apparatus.

15. The receiving apparatus of claim 14, wherein the another device is a communication counterpart device of the transmitting apparatus.

16. The receiving apparatus of claim 14, wherein the another device is a device other than a communication counterpart device of the transmitting apparatus.

17. The receiving apparatus of claim 10, wherein the receiving apparatus includes a reception status estimating circuit for estimating a communication status based on a change in phases of a sync output signal generated by the synchronizing circuit, and the reception status estimating circuit determines at least one of a peak power of a pulse sent by the transmitting apparatus and having a great peak power, and the pulse repetition cycle based on the change in phases.

18. The receiving apparatus of claim 17, wherein the synchronizing circuit determines, based on an average value of phase changes of a sync output signal generated by the synchronizing circuit, at least one of the peak power of the pulse and the pulse repetition cycle.

19. A transmitting apparatus comprising:
a pulse generating circuit for generating a pulse string including large pulses and small pulses, the large pulses having greater pulse peak power than the small pulses;
a pulse repetition cycle determining circuit for determining
(i) a pulse repetition cycle of the pulses in the pulse string based on a clock signal, and
(ii) an interval during which the large pulses are transmitted according to an information;
a peak power determining circuit for determining the peak power of the pulses depending to the interval determined; and
a modulator for modulating the pulses in the pulse string with transmission data including a first data for generating a radio frequency (RF) transmission signal so that the interval during which the large pulses are transmitted is controlled based on a type of the transmission data or a status of the wireless communication path between the transmitting apparatus and a receiving apparatus receiving the pulses so that an average power of the RF transmission signal is constant.

20. The transmitting apparatus according to claim 19 further comprising:
a receiving means for receiving a feed back information indicating receiving quality of the first data, but not the whole data, transmitted to a receiving apparatus, fed back from the receiving apparatus, and
wherein
the pulse repetition cycle determining circuit updates the interval to another interval based on the feed back information, and
the peak power updates the peak power according to the another interval updated.

21. The transmitting apparatus according to claim 20, wherein
the peak power determining circuit increases the peak power applied to next first data when the feed back information indicates a deterioration of the quality.

22. A wireless communication apparatus comprising:
a receiving unit, including
a reception status estimating circuit for estimating a communication quality between another wireless communication apparatus based on an information received sent from the another wireless communication apparatus, and
a transmitting unit transmitting a radio frequency (RF) transmission signal including a pulse string having large pulses and small pulses, the large pulses having greater pulse peak power than the small pulses, the transmitting unit including,
a pulse repetition cycle determining circuit for determining a pulse repetition cycle of the pulse string,
a peak power determining circuit for determining the pulse peak power of the pulses,
wherein the pulse repetition cycle determining circuit and the peak power determining circuit determine the pulse repetition cycle and the pulse peak power so that the large pulses are transmitted at an interval that is controlled based on a type of transmission data or a status of a wireless communication path between the transmitting unit and receiving unit so that an average power of the RF transmission signal is constant.

* * * * *